Figure 1:
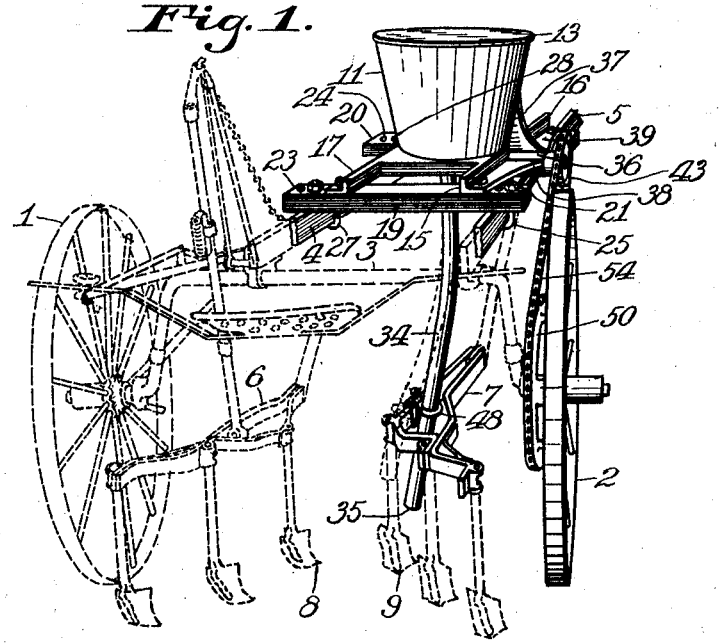

O. HENTHORN.
FERTILIZER FEEDER FOR CULTIVATORS.
APPLICATION FILED JAN. 24, 1919.

1,387,265.

Patented Aug. 9, 1921.

2 SHEETS—SHEET 1.

WITNESS

INVENTOR:
Oscar Henthorn,
BY
E. T. Silvius
ATTORNEY.

O. HENTHORN.
FERTILIZER FEEDER FOR CULTIVATORS.
APPLICATION FILED JAN. 24, 1919.
1,387,265.
Patented Aug. 9, 1921.
2 SHEETS—SHEET 2.
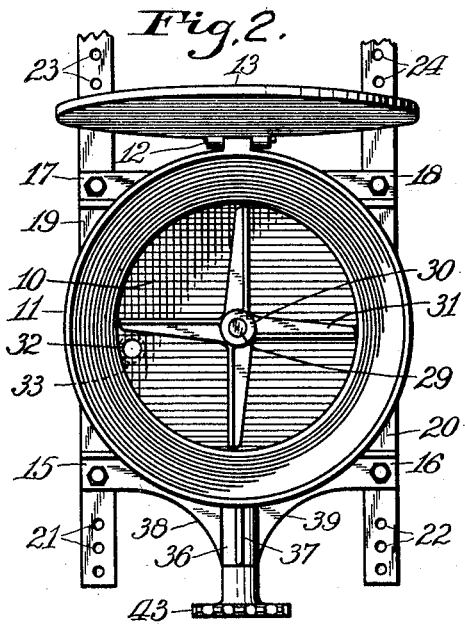
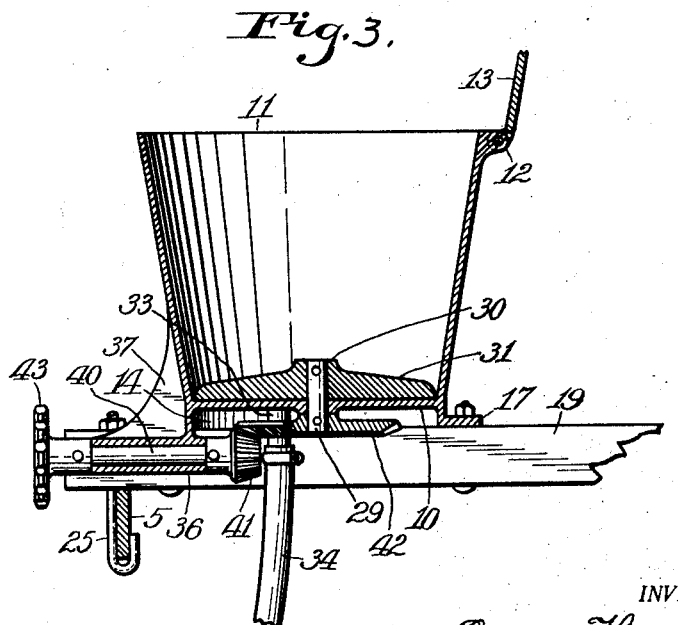
WITNESS:
Robert Liebrich
F. W. Roeder
INVENTOR:
Oscar Henthorn,
BY
E. T. Silvius,
ATTORNEY.

UNITED STATES PATENT OFFICE.

OSCAR HENTHORN, OF BROWN TOWNSHIP, MONTGOMERY COUNTY, INDIANA.

FERTILIZER-FEEDER FOR CULTIVATORS.

1,387,265. Specification of Letters Patent. Patented Aug. 9, 1921.

Application filed January 24, 1919. Serial No. 272,828.

*To all whom it may concern:*

Be it known that I, OSCAR HENTHORN, a citizen of the United States, residing in Brown township, in the county of Montgomery and State of Indiana, have invented a new and useful Fertilizer-Feeder for Cultivators, of which the following is a specification, reference being had to the accompanying drawings, and to the letters and figures of reference marked thereon.

This invention relates to means for carrying commercial fertilizer on a cultivator and feeding the fertilizer to the ground while cultivating, the invention having reference more particularly to a fertilizer-feeding outfit that is designed to be readily applied to or removed from cultivators, and especially those in possession of farmers.

An object of the invention is to provide a fertilizer feeder of such construction as to be adapted to feed fertilizer close to rows or hills of growing corn or other crops during cultivating operations, so as to distribute the fertilizer to the best advantage and economically and at an advantageous time during the growth of the crops.

Another object is to provide a unitary portable fertilizer-feeding plant or outfit which shall be so constructed as to be adapted to be readily applied to cultivators already manufactured, so that the farmer can readily equip his cultivator to distribute fertilizer when needed, and as readily remove the outfit from the cultivator when not needed.

A further object is to provide a simple and inexpensive fertilizer - feeder of the above-mentioned character which shall be so constructed as to be reliable, durable and economical in use.

With the above-mentioned and other objects in view, the invention consists in a portable fertilizer-feeder and appurtenances having novel features of construction whereby the objects of the invention are attained; and, the invention consists also further in the parts and combinations and arrangements of parts as hereinafter particularly described and further defined in the accompanying claims.

Referring to the drawings,—Figure 1 is a rear perspective view of a popular type of cultivator, shown in broken lines, to which the invention is applied; Fig. 2 is a top plan of the fertilizer feeder proper or box from which the fertilizer is fed; Fig. 3 is a central vertical section of the improved fertilizer feeder.

Similar reference characters indicate corresponding elements or features of construction throughout the different figures of the drawings.

As illustrating the applicability of the invention to a well known cultivator, the leading features of the latter are referred to and comprise two carrying wheels 1 and 2, an arched axle 3, frame beams 4 and 5 connected to the axle, cultivator gang frames 6 and 7 which may be variously connected with parts of the vehicle and have cultivator shovels 8 and 9 mounted thereon respectively, the arrangement being such that one gang of cultivator shovels or teeth work at one side and the other gang at the opposite side of a row of plants; and the primary purpose of the invention is to deliver fertilizer ahead of the leading shovel or tooth of one gang adjacent to the row of plants where the fertilizer shall be directly effective.

The invention includes a fertilizer box comprising a flat bottom 10 and a side wall 11 at the top of which is a hinge 12 connecting a lid 13 to the side wall. The box has a base 14 extending below the bottom 10 and it is provided with base arms 15, 16, 17 and 18, two of which are secured to a base beam 19 and the remaining two arms secured to a base beam 20. The beams are suitably spaced apart and are of sufficient length to rest upon the frame beams 4 and 5 of different cultivators in which the frame beams may be spaced different distances apart. The base beams are provided respectively with bolt holes 21 and 22 in proximity to one end of the beams and similar holes 23 and 24 in proximity to the opposite end of the beams. Four hook-bolts 25, 26, 27 and 28 are provided, two of them being arranged in holes adjacent to one end of the base beams and in engagement with the cultivator frame beam 5, the remaining two being arranged in the holes adjacent to the opposite end of the base beams and in engagement with the opposite beam 4, whereby the base beams are removably secured to the frame beams.

The fertilizer is to be carried in the box and in order to distribute it a shaft 29 is vertically mounted rotatably in the middle of the bottom 12 of the box. A hub 30 is secured to the shaft and has a suitable number of fingers 31 thereon that are carried about the top of the bottom 10 and across an aperture 32 in the bottom adjacent to the wall 11. The bottom 10 has a nipple 33 extending downward from the aperture and a flexible pipe 34, such as a piece of rubber hose, is clamped to the nipple and has its discharge end 35 arranged in advance of the leading shovel or tooth of one of the cultivator gangs. A journal box 36 is fixed on and carried by the base ring 14 and has a brace 37 fixed to its top and also to the wall 11 of the feeder box, other braces 38 and 39 being integral with the journal box and also the base arms 15 and 16 respectively. A driving shaft 40 is rotatably mounted in the journal box and has a bevel pinion 41 secured to one end portion thereof that engages a bevel gear wheel 42 which is secured to the shaft 29 below the bottom 10; and a sprocket wheel 43 is secured to the outer end portion of the shaft 40. The fertilizer-feeder proper, as will be seen, is built as a unit to be readily attached to the cultivator frame.

In order to guide the flexible pipe 34 a device is provided which comprises a clamp 48 that is suitably secured to the gang frame 7 or a member thereof, and receives the pipe 34 and permits movement of the pipe slightly or permits the gang frame as it rises or falls to move the clamp longitudinally on the flexible pipe. The guiding device for the pipe may be variously arranged to guide the pipe to either one or the opposite side of the gang frame, as may be desired, or may be shifted forward or rearward to change the delivery portion of the pipe as indicated by broken lines in Fig. 1.

In some cases a new carrying wheel 2 may be provided with a driving sprocket wheel, but preferably a separate hubless sprocket wheel 50 is provided secured to an old carrying wheel. A sprocket chain 54 is arranged in connection with the sprocket wheel 50 and also the sprocket wheel 43.

In practical use a quantity of fertilizer is placed in the distributer box and, the cultivating operations having been begun the rotating sprocket wheel 50 operates the sprocket chain which rotates the sprocket wheel 43, resulting in the operation of the shaft 29 which operates the fingers 31. The fingers agitate the fertilizer and feed it to the aperture 32 as each finger moves across the aperture, the fertilizer descending through the pipe 34 and dropping therefrom to the ground along one side of the row of plants, the fertilizer being covered by the ground as it is turned over by the following cultivator shovels or teeth.

Having thus described the invention, what is claimed as new is—

1. In a fertilizer feeder for cultivators, the combination of two base beams spaced apart, a fertilizer box with an outlet, said box having arms secured to one of said beams and arms secured to the remaining one of said beams, a long journal box integral with a portion of the fertilizer box between said beams, a brace integral with the journal box and a side portion of the fertilizer box, two braces integral with the journal box and also with two of said arms respectively, a driving shaft arranged between said beams and rotatably supported in said journal box, said shaft extending beyond said beams, a sprocket wheel secured to said shaft beyond said beams, and an agitator and feeder in the fertilizer box geared to said shaft.

2. In a fertilizer feeder for cultivators, the combination of two base beams spaced apart in parallel order, each beam having a plurality of bolt-holes adjacent to one end and a plurality of bolt-holes adjacent to the opposite end thereof, two hook bolts connected to one of said beams in two of said bolt-holes adjacent to the opposite ends respectively of the beam, two hook bolts connected to the remaining one of said beams in two of said bolt-holes adjacent to the opposite ends respectively of the beam, a fertilizer box having arms secured upon one of said beams and arms secured upon the remaining one of said beams, said box having an outlet, a long journal box integral with a portion of the fertilizer box between said beams, a driving shaft arranged between said beams and rotatably supported in said journal box, a sprocket wheel secured to said shaft in proximity to one end of said beams, and an agitator and feeder in the fertilizer box geared to said shaft.

In testimony whereof I affix my signature in presence of two witnesses.

OSCAR HENTHORN.

Witnesses:
NORA WARD,
CHARLES M. McCABE.